US009508137B2

(12) United States Patent
Byers

(10) Patent No.: US 9,508,137 B2
(45) Date of Patent: Nov. 29, 2016

(54) AUTOMATED PATRON GUIDANCE

(71) Applicant: Cisco Technology, Inc., San Jose, CA (US)

(72) Inventor: Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 14/268,250

(22) Filed: May 2, 2014

(65) Prior Publication Data
US 2015/0317835 A1    Nov. 5, 2015

(51) Int. Cl.
| G06T 19/00 | (2011.01) |
| G06T 1/20 | (2006.01) |
| G06K 9/00 | (2006.01) |
| G06T 7/00 | (2006.01) |
| H04L 29/08 | (2006.01) |
| B60Q 1/00 | (2006.01) |
| H04L 29/06 | (2006.01) |

(52) U.S. Cl.
CPC . *G06T 7/00* (2013.01); *B60Q 1/00* (2013.01); *G06K 9/00295* (2013.01); *G06K 9/00335* (2013.01); *G06K 9/00369* (2013.01); *G06T 1/20* (2013.01); *G06T 19/006* (2013.01); *H04L 65/1083* (2013.01); *H04L 67/10* (2013.01); *H04L 67/12* (2013.01); *H04L 67/18* (2013.01)

(58) Field of Classification Search
None
See application file for complete search history.

(56) References Cited

U.S. PATENT DOCUMENTS

| 2002/0065785 | A1* | 5/2002 | Tsuda | G06Q 20/3674 705/67 |
| 2009/0327228 | A1* | 12/2009 | Krause | G06Q 30/02 |
| 2010/0125816 | A1* | 5/2010 | Bezos | G06F 1/1626 715/863 |
| 2012/0084121 | A1* | 4/2012 | Campbell | G06Q 10/02 705/7.35 |
| 2013/0167059 | A1* | 6/2013 | Legris | G06F 3/0482 715/769 |
| 2013/0293580 | A1* | 11/2013 | Spivack | G06Q 30/0643 345/633 |
| 2014/0039792 | A1* | 2/2014 | Seetharam | G01C 21/3679 701/538 |
| 2014/0139548 | A1 | 5/2014 | Byers | |

OTHER PUBLICATIONS

Waze, "Get the best route, every day, with real-time help from other drivers" [online] [retrieved Apr. 29, 2014] Retreived from the Internet <URL:https://www.waze.com/>, 4 pages.
Vegas Experience, "Freemont Street Experience" [online] [retrieved Apr. 29, 2014] Retrieved from the Internet <URL:http://www.vegasexperience.com/#viva/>, 1 page.
Reactix, "For Every Action There is a Reaction" [online] [retrieved Apr. 29, 2014] Retrieved from the Internet <URL:http://www.reactrix.com/>, 1 page.

(Continued)

*Primary Examiner* — Michelle Chin
(74) *Attorney, Agent, or Firm* — Leon R. Turkevich

(57) ABSTRACT

In one embodiment, a method comprises determining, by a first access network computing node at a venue, a position of a person based on an image of the person captured with at least one camera at the venue; controlling rendering, by the first access network computing node, of an icon moving toward a destination in response to a determined movement of the person; and handing-off, by the first access network computing node, the controlling rendering of the icon to a second access network computing node in response to the position of the person moving from a first domain zone associated with the first access network computing node to a second domain zone associated with the second access network computing node.

27 Claims, 5 Drawing Sheets

(56) References Cited

OTHER PUBLICATIONS

Carmax, "Carmax TV Spot Start Line" [online] [retrieved Apr. 29, 2014] Retrieved from the Internet <URL:http://www.ispot.tv/ad/7koJ/carmax-start-line>, 11 pages.

Tracking, "Finding and Tracking People" [online] [retrieved Apr. 29, 2014] Retrieved from the Internet <URL:http://luthuli.cs.uiuc.edu~daf/tracking.html>, 2 pages.

Agent, "Comprehensive Video Analytics Solutions" [online] [Retrieved Apr. 29, 2014] Retrieved from the Internet <URL:http://www.agentvi.com/>, 1 page.

IBM, "IBM Intelligent Video Analytics" [online] [Retrieved Apr. 29, 2014] Retrieved from the Internet <URL:http://www-03.ibm.com/software/products/us/en/intelligent-video-analytics/>, 2 pages.

MathWorks, "Computer Vision System Toolbox" [online] [Retrieved Apr. 29, 2014] Retrieved from the Internet <URL:http://www.mathworks.com/products/computer-vision/examples.html?file=%2Fproducte%2Fdemos%2Fshipping%2Fvision%2Fviptrackpeople.html>, 3 pages.

Fraunhofer IOSB, "Image based Object Localization" [online] [Retrieved Apr. 29, 2014] Retrieved from the Internet <URL:http://www.iosb.fraunhofer.de/servlet/is/20346/>, 3 pages.

IEEE Spectrum, "The Augmented Reality America's Cup" [online] [Retrieved Apr. 29, 2014] Retrieved from the Internet <URL:http://spectrum.ieee.org/consumer-electronics/audiovideo/the-augmented-reality-americas-cup>, 8 pages.

Meingast et al., "Automatic Camera Network Localization using Object Image Tracks", Oct. 2007, IEEE 11th International Conference on Computer Vision, Rio de Janeiro, Brazil, pp. 1-9.

Martinez-de Dios et al., "Localization and Tracking Using Camera-Based Wireless Sensor Networks", 2011, Sensor Fusion—Foundation and Applications, Spain, pp. 1-21.

\* cited by examiner

US 9,508,137 B2

AUTOMATED PATRON GUIDANCE

TECHNICAL FIELD

The present disclosure generally relates to providing patron guidance services by fog computing nodes.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

In many venues with large crowds or complex logistics, ushers, bellmen, guards, and information desk staff are employed to direct or physically lead people to their seats, rooms, or other destinations. When patrons arrive at such a venue (theater, arena, stadium, auditorium, etc) they are greeted by a ticket taker, directed to their correct seating section by one set of ushers, and ultimately escorted to their seats by an usher assigned to a particular section of the venue. A large stadium with perhaps 75000 seats may employ several hundred ushers to manage a capacity crowd, and much of their time is spent standing around.

Similarly, in smaller venues (restaurants, doctor's office, library, hospital, etc.) with relatively small crowds, hostesses, nurses, librarian, support staff, etc. are employed to direct or physically lead people to their seats, rooms, or other destinations. Using such employees to direct patrons to their proper location takes them away from their primary employment function, decreases productivity of such employees.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
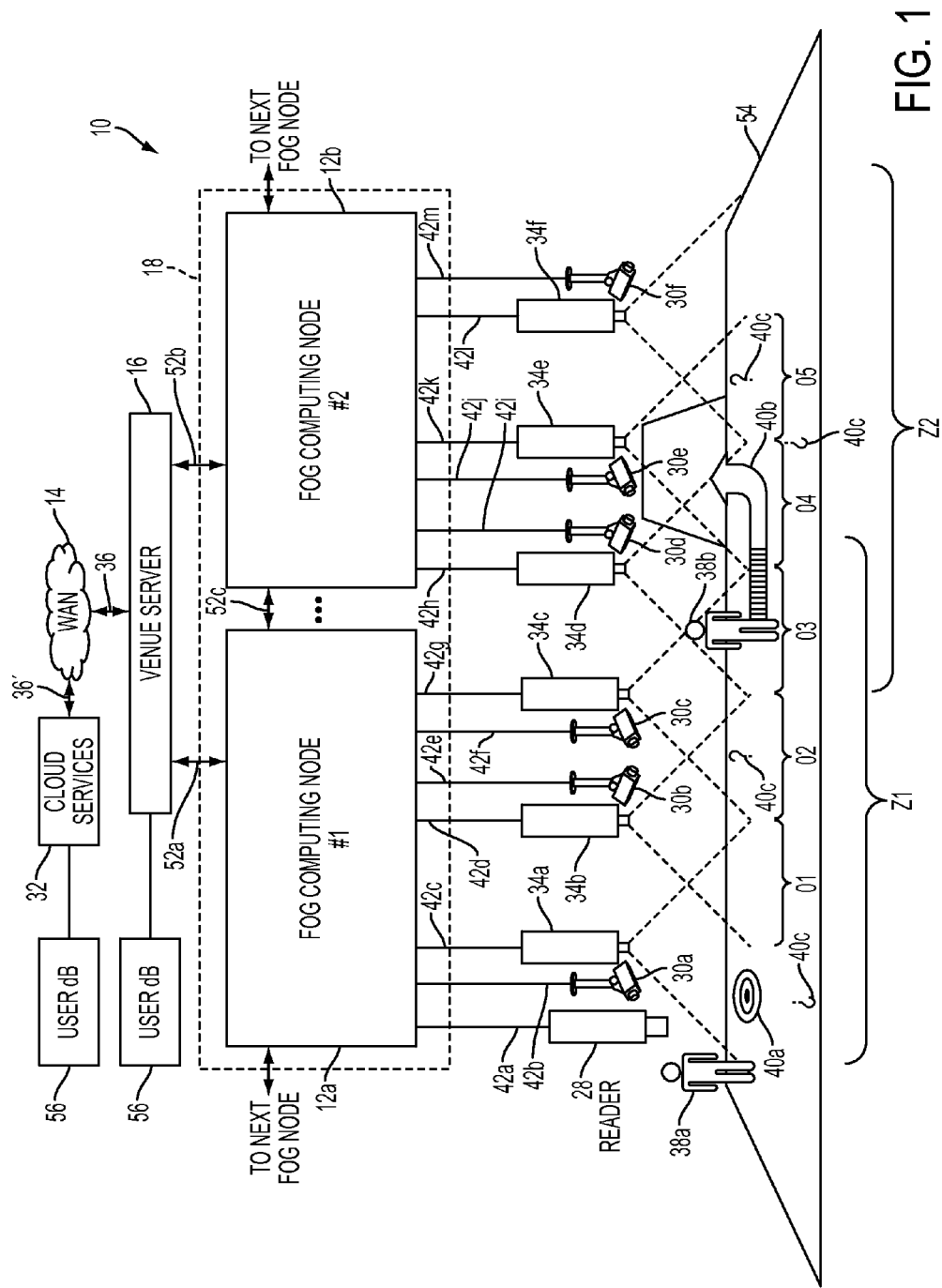
FIG. 1 is an example system having an apparatus for automating and/or augmenting person guidance, according to an example embodiment.

In one embodiment, a method comprises determining, by a first access network computing node at a venue, a position of a person based on an image of the person captured with at least one camera at the venue; controlling rendering, by the first access network computing node, of an icon moving toward a destination in response to a determined movement of the person; and handing-off, by the first access network computing node, the controlling rendering of the icon to a second access network computing node in response to the position of the person moving from a first domain zone associated with the first access network computing node to a second domain zone associated with the second access network computing node.

In another embodiment, an apparatus comprises a network interface circuit configured to interface a first access network computing node in a venue with a second access network computing node at the venue, and a processor circuit. The processor circuit is configured to determine a position of a person based on an image of the person captured with at least one camera at the venue, control rendering of an icon moving toward a destination in response to a determined movement of the person, and hand-off the control of rendering of the icon to the second access network computing node in response to the position of the person moving from a first domain zone associated with the first access network computing node to a second domain zone at the venue associated with the second access network computing node.

In another embodiment, logic is encoded in one or more non-transitory tangible media for execution by a machine, and when executed by the machine operable for: determining, by a first access network computing node at a venue, a position of a person based on an image of the person captured with at least one camera at the venue; controlling rendering, by the first access network computing node, of an icon moving toward a destination in response to a determined movement of the person; and handing-off, by the first access network computing node, the controlling rendering of the icon to a second access network computing node in response to the position of the person moving from a first domain zone associated with the first access network computing node to a second domain zone associated with the second access network computing node.

DETAILED DESCRIPTION

Fog computing has been proposed as a virtualized platform that provides compute, storage, and networking services in a network layer between end devices and traditional cloud computing data centers. The geographic distribution of fog computing enables new services and applications, for example delivering high quality streaming to moving vehicles, improved mobility support, improved support for wireless sensor networks, etc. Fog computing provides for benefits such as, e.g., performance, latency, security, network bandwidth, and reliability.

Particular embodiments enable an access network computing node, also referred to herein as a "fog node", to provide automated or greatly augmented person (e.g., patron) guidance. In particular, access network computing nodes can use a plurality of cameras and projectors as a basis for identifying a specific patron at a venue and projecting an icon along a route at the venue that the patron can follow to a destination at the venue. In some embodiments, the specific patron's position and velocity can be used to control rendering of the icon.

According to an example embodiment, an array of projectors (e.g., high brightness, low power, modestly sized light emitting diode (LED) projectors, laser projectors, and/or video projectors) can be positioned to "paint" walls and/or floors of a venue (e.g., theater, arena, stadium, auditorium, campus, large industrial complex, industrial building, restaurant, doctor's office, library, hospital, etc.) with a projected image that can be used to direct patrons to their specified destinations. Cameras can be used to monitor movements of the patrons and analytics algorithms can determine the patrons' position, direction and activities, which are used to update the projected image. In some embodiments, the projected image is updated in real-time. Fog computing nodes can dynamically recalculate the projected images, and the projectors can project moving "targets" onto the walls and/or floors of the venue for patrons to follow. Fog computing nodes can be coordinated to make an array of cameras and projectors act as a single venue sized camera and projector. The fog computing nodes can perform sophisticated multi-camera video analytics, compose, and render large, odd aspect ratio video scenes. Highly scalable, modular hardware, e.g., input/output (I/O) boards, and hundreds of X86 core equivalents, can be used to host demanding analytics processing.

FIG. 1 is an example system 10 having an apparatus 12 for automating and/or augmenting person guidance, according to an example embodiment. The apparatus 12 is a physical machine (i.e., a hardware device) configured for implementing network communications with other physical machines 14, 16, 28, 30, 32, and/or 34 within the system 10.

Two or more access network computing nodes 12 (e.g., 12a and 12b) can be implemented using a "fog" architecture discussed herein. The access network computing nodes 12 can receive image data from one or more cameras 30 (e.g., 30a-30f). In an example embodiment, camera 30b can be positioned for viewing forward along a normal (i.e., forward) direction of person 38 (e.g., patron, vendor employee, etc.) movement and camera 30c can be positioned for viewing backward against the normal direction of person 38 movement.

The access network computing nodes 12 can send imaging data to the projectors 34 (e.g., 34a-34f). One projector 34 can project images on a floor, one projector 34 can project images on a right wall, and one projector 34 can project images on a left wall. The access network computing nodes 12 can interface with peripherals (e.g., reader 28). The reader 28 can be, e.g., a credit card reader, a bar code scanner, a Quick Response (QR) code reader, a radio frequency identification (RFID) tag reader, a microphone, etc. In some embodiments, reader 28 can include a speaker to instruct the patron 38 to follow an icon 40 to reach a destination at a venue 54.

The access network computing nodes 12a and 12b each can include three sets of projectors 34. Each projector 34 can include three micro-projectors respectively driven from each access network computing node 12. The micro-projectors can be High-Definition (HD) (e.g., 1920×1080 pixels) projectors, with example embodiments using one micro-projector projecting an image on a left wall, one micro-projector projecting an image on the floor below the projectors 34, and one micro-projector projecting an image on a right wall. Three micro-projectors 34 can serve, e.g., about ten feet of a corridor at the venue 54.

The projectors 34 in a brightly lit, high ceiling venue 54 (e.g., a large stadium or arena) may require more power, higher resolution, and different lens focal length than projectors 34 used in lower light, lower ceiling corridors deeper within the venue 54. High power digital projectors 34 can be employed, and/or deflected laser based projectors 34 can be employed by the system 10. The projectors 34 can be used in combination with LED aisle lights and seat-back illuminations to render routes for patrons 38.

Complementing projectors 34 are cameras 30 that can "observe" a venue 54. The plurality of cameras 30 can monitor areas of the venue 54 from multiple angles. Analyzer 24 (FIG. 3) can process the graphical information produced by cameras 30 to extract various person 38 features, that can include, e.g., identity, location, speed, direction, and activities. The analyzer 24 can implement gesture recognition. The cameras 30 can also photograph images that are painted on walls and/or floors by the projectors 34, which aid in alignment of a video mosaic, and can also detect failed and/or misaligned projectors 34 and/or cameras 30. The cameras' 30 captured images can provide for a closed image feedback loop to assist in partially mitigating an effect of the person 38, or other objects, casting shadows when an obstruction gets between the projectors 34 and a desired landing place of an image component, such as icon 40. If a particular camera 30 and its associated analyzer 24 detects the obstruction (e.g., a shadow), the analyzer 24 can instruct a renderer 26 (FIG. 3) to locate a different overlapping projector 34 that projects on a same landing place from a different angle, and increase the brightness on the overlapping projector 34 in the region of the obstruction.

In example embodiments, cameras 30a, 30b, and 30c, and projectors 34a, 34b, and 34c can connect to access network computing node 12a, and can cover approximately 40 feet of an internal corridor (e.g., domain zone Z1) of a venue 54. Cameras 30d, 30e, and 30f, and projectors 34d, 34e, and 34f can connect to access network computing node 12b, and can additionally cover approximately 40 feet of an internal corridor (e.g., domain zone Z2) of the venue 54 immediately adjacent to the internal corridor within domain zone Z1. Additional access network computing nodes 12 can be deployed to cover public spaces of a large venue 54 that system 10 will provide automated and/or augmented guidance for the patrons 38.

The access network computing nodes 12 can cause the icon 40 to be displayed along a calculated route to a destination location, according to an example embodiment. The icon 40 can be personalized with a bulls eye icon 40a, an arrow icon 40b, seat location information, venue 54 feature highlights, advertisements, start time countdown, distance countdown, directional lines, commercial logo, static images, video, emergency symbols, etc.

The system 10 includes an access network 18, also referred to herein as a "fog network". The access network 18 may include the access network computing nodes 12 (e.g., 12a and 12b), also referred to as "fog nodes", that provide link layer data connections 42 for person 38 guidance devices 30 and 34. Each of the access network computing nodes 12 can include at least one link layer data connection 52 that provides the access network computing nodes 12 with data link access to at least one venue server 16 and other access network computing nodes 12. The venue server 16 can include a wide area network (WAN) connection 36 to reach cloud services 32 via a WAN 14 (e.g., the Internet). The cloud services 32 and the at least one venue server 16 can be connected to a user database 56. The user database 56 can store user specific attribute information, e.g., user-ticket information, user preferences, vendor information, employee information, social-media site information, etc. The link layer data connections 36, 42, and 52 can be implemented using, e.g., High-Definition Multimedia Interface (HDMI), Wi-Fi, Fiber optic, HomePlug, high speed Ethernet, etc.

Figure 2:
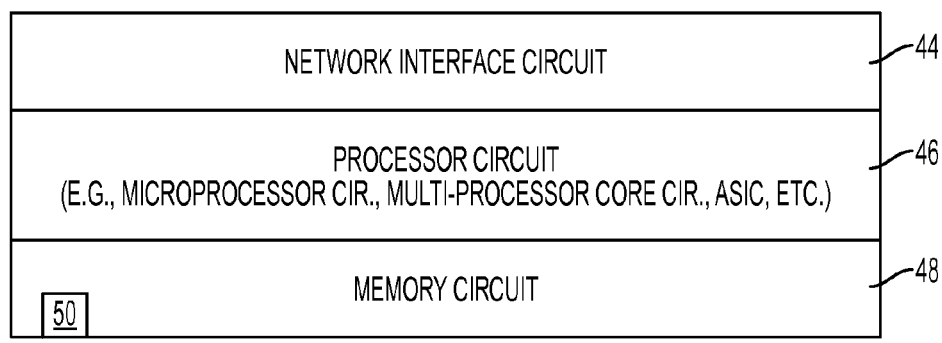
FIG. 2 illustrates an example implementation of the apparatus of FIG. 1, according to an example embodiment.

FIG. 2 illustrates an example implementation of the apparatus of FIG. 1, according to an example embodiment.

Each apparatus 12, 16, and/or 32 can include a network interface circuit 44, a processor circuit 46, and a memory circuit 48. The network interface circuit 44 can include one or more distinct physical layer transceivers for communication with any one of the other devices 12, 16 and/or 32; the network interface circuit 44 also can include an IEEE based Ethernet transceiver for communications with the devices of FIG. 1 via any of the link layer data connections 36, 42, and 52 (e.g., a wired or wireless link, an optical link, etc.).

The processor circuit 46 can be configured for executing any of the operations described herein, and the memory circuit 48 can be configured for storing any data or data packets as described herein.

Any of the disclosed circuits of the devices 12, 16, and/or 32 (including the network interface circuit 44, the processor circuit 46, the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 48) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 48 can be implemented, for example, using a non-volatile memory such as a programmable read only memory (PROM) or an EPROM, and/or a volatile memory such as a DRAM, disk (solid state or rotating), etc.

Figure 3:
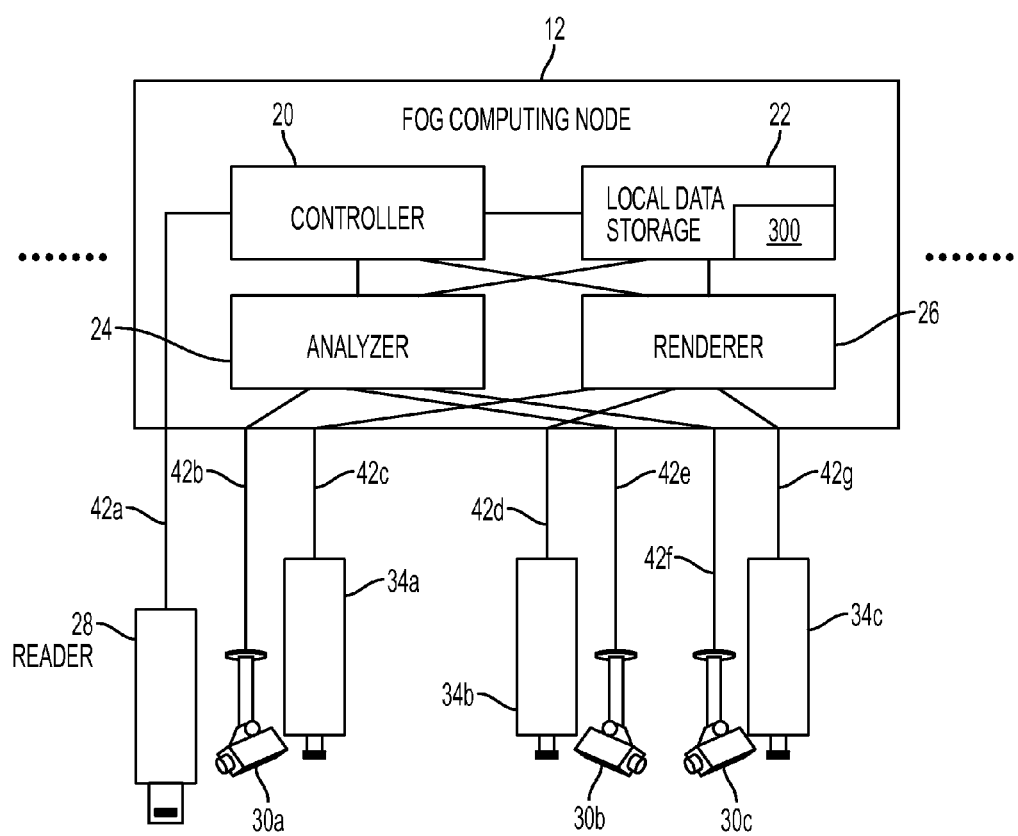
FIG. 3 illustrates in further detail the apparatus of FIG. 1, according to an example embodiment.

FIG. 3 illustrates in further detail the apparatus of FIG. 1, according to an example embodiment. An example access network computing node 12 can include a controller 20, a local data storage 22, an analyzer 24, and a renderer 26. The controller 20 can include the processor circuit 46 for implementing high level supervisory functions and determining an identity of a person 38 via data provided by the reader 28 and cameras 30. The access network computing node 12 can include the local data storage 22 (e.g., a hard disk drive and/or solid state disc (SSD)) for providing storage of image data to be rendered by projectors 34, storage of imaging information received from the cameras 30, person 38 preferences (e.g., specific routes, avoid stairs, avoid crowds, etc.), icon 40 location history, icon 40 rendering information, person 38 identities, etc. The renderer 26 can include a Graphics Processing Unit (GPU). The renderer 26 can accept data from the controller 20 and the local data storage 22 as a basis for producing multiple coordinated video outputs that are sent to the plurality of nearby projectors 34. The analyzer 24 can accept video signals from the plurality of cameras 30 connected to the analyzer's 24 associated access network computing node 12. The analyzer 24 can execute analytics algorithms to extract information about identities, locations, and activities of the persons 38 in view of the cameras 30. The analyzer 24 can determine the patron's 38 position at a venue 54, direction of movement, speed, eye gaze, and/or gestures as a basis for anticipating the patron's 38 movements and/or direction of attention. This information may be used by the system 10 to provide real-time guidance to the patron 38 as the patron 38 moves about the venue 54. Likewise, the analyzer 24 can receive interactive requests from the persons 38 (e.g., gestures detected by the cameras 30) and the system 10 can provide the persons 38 with requested information, e.g., video chat, maps, menus, price lists, advertisements, requests for human service, and/or other supplementary information.

The access network computing nodes 12 can be networked over at least one link layer data connection 52 to at least one venue server 16. The at least one venue server 16 can update the access network computing node's 12 resident local data storage 22, and can coordinate inter-node handoffs between access network computing nodes 12 as patrons 38 move between the domain zones of many access network computing nodes 12. The at least one venue server 16 also interconnects the access network 18 to the WAN 14, enabling the venue server 16 to access web content, and also allowing the access network 18 to connect to cloud services 32, where higher level applications processing can be performed using data generated by the access network computing nodes 12.

The system's 10 array of video projectors 34 can be positioned to continuously "cover" at least some portion of walls and/or floor of a venue 54 where the patrons 38 are likely to need guidance. In some embodiments, the projectors 34 are attached at intervals at the venue 54 to create overlapping images in domain zones (e.g. O1, O2, O3, O4, and O5) as the projectors 34 are projected on walls and/or floor of the venue 54. The projectors 34 can include multiple projection engines, e.g., one projection engine that can produce an image for a right wall, one projection engine that can produce an image for a left wall, and one projection engine that can produce an image for a floor. Depending upon ceiling height, projection lens focal length, desired image size, and brightness, projectors 34 may be spaced at intervals of approximately every ten feet. The projectors 34 can be driven by outputs of the renderers 26, and "paint" computer-generated mosaic pictures on the venue's 54 surfaces, such that any image of video content can be rendered on any visible wall and/or floor in public and/or private areas of the venue 54.

The renderer 26 can adjust the geometry of pixels as they are extracted from an example frame buffer 300 (discussed in more detail below in FIG. 4) stored by the access network computing nodes 12 (e.g., stored in the local data storage 22). This adjustment of the geometry of pixels can be performed before the pixels are sent to the projectors 34. The adjustment of the geometry of pixels can be used to compensate for parallax, projector alignment, keystone distortion, etc., to allow the projected images projected by two or more projectors 34 to fall on top of each other. The access network computing nodes 12 can render and project test patterns with the projectors 34, capture the test patterns with the cameras 30, and analyze the captured test patterns with the analyzer 24 as a basis for optimizing the alignment, window positions, rendering window locations, projection geometrics, and/or overlap of images projected with the projectors 34.

The system 10 can provide automated and/or augmented patron 38 guidance by coordinating the functions performed by the at least one venue server 16, the controller 20, the analyzer 24, the renderer 26, the cameras 30, the cloud services 32, and the projectors 34. The system 10 can use the distributed fog computing techniques of the example embodiments, where significant local processing (for image creation and analysis, as well as system 10 control), storage (for storing the graphics prior to rendering, and saving video from the cameras 30), and I/O (to connect to the WAN 14 backbone, and auxiliary sensors like bar code readers 28) reside in a distributed, interconnected access network 18. Access network computing nodes 12 may be located physically near clusters of projectors 34 and cameras 30 to minimize cable lengths, and enable local intelligence to do much of the example closed-loop video processing performed by the access network computing nodes 12. The proximity of the access network computing nodes 12 to the clusters of projectors 34 and cameras 30 can reduce data traffic on data links 36 and 52, can reduce computational loads on venue server 16 and cloud services 32, and can speed automated guidance response time of the system 10.

Immediately before a big event in a large venue 54, there may be thousands of patrons 38 simultaneously moving toward their seats. The system 10 can ensure the correct controller 20, analyzer 24, and renderer 26 are being employed at the venue 54 for patrons 38 to have an assigned icon 40 and routes to follow, based on patron 38 identities, patron 38 locations, patron 38 speeds, and eye gaze angles of individual patrons 38. Some of the patrons 38 that are using a same corridor may cross routes, overtake each other, etc. The system 10, via the controller 20, analyzer 24, renderer 26, and cameras 30, can track persons 38 by analyzing eye gaze angles of nearby persons 38. Eye gaze angle analysis can ensure the icons 40 assigned to the persons 38 are always near the particular person's 38 center of attention, so the particular person 38 does not mistakenly follow another person's 38 similar icon 40.

Figure 5:
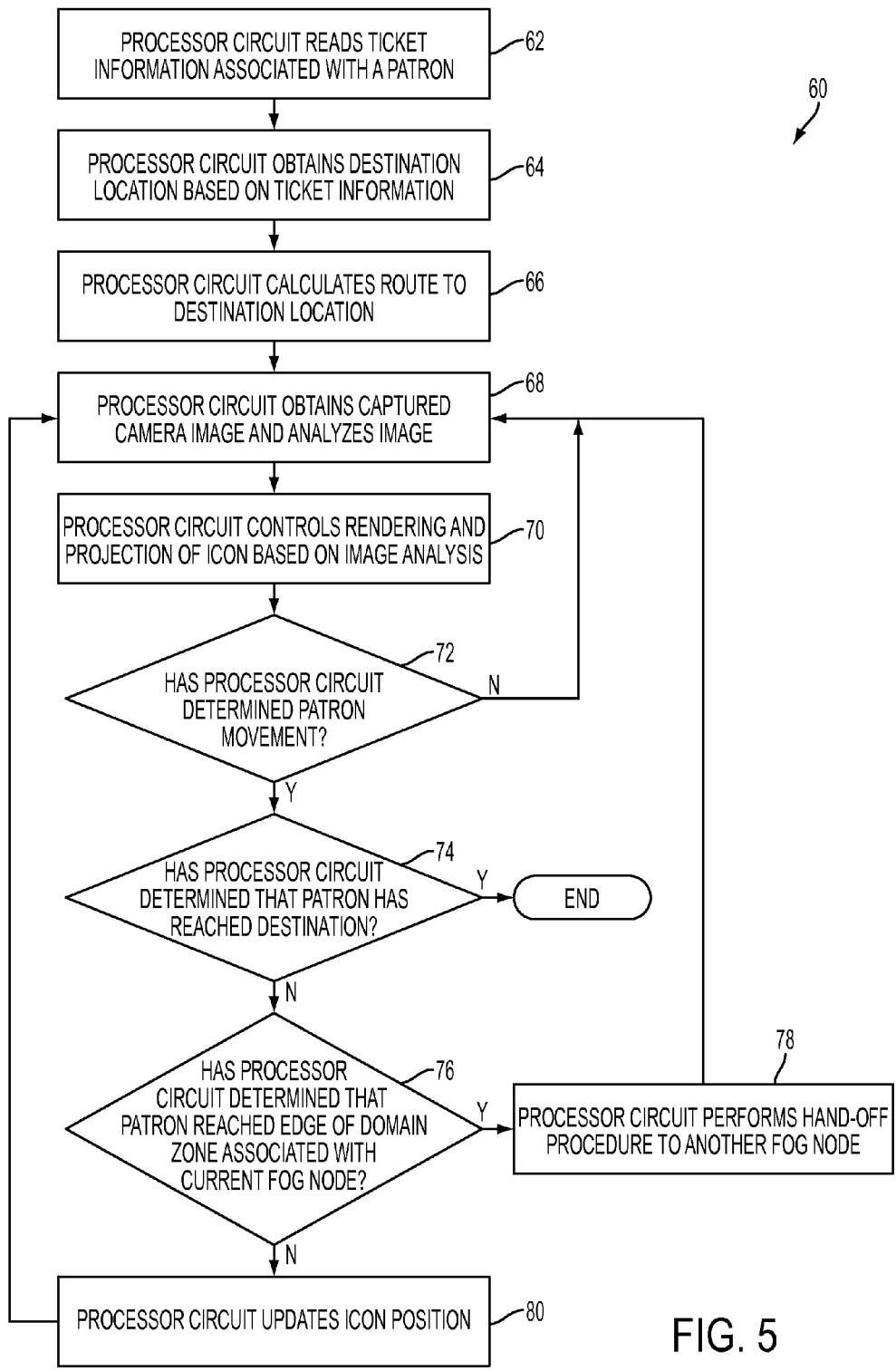
FIG. 5 illustrates an example method of automating and/or augmenting patron guidance, according to an example embodiment.

FIG. 5 illustrates an example method of automating and/or augmenting patron guidance, according to an example embodiment.

As described in combination with respect to FIGS. 1 and 2, the access network computing nodes 12 (executed for example by processor circuit 46 of FIG. 2 and/or a logic circuit) can implement a method 60 for automated and/or augmented patron guidance, according to example embodiments. Each access network computing node 12 (e.g., 12a and 12b) can independently implement the method 60 of FIG. 5, including initiating an inter-node hand-off and accepting an inter-node hand-off of patron 38 guidance as the patron 38 moves from a first domain zone (e.g., Z1) to second domain zone (e.g., Z2).

Referring to operation 62 of FIG. 5, the patron 38a can enter a venue 54 covered by the fog computing node 12a associated with domain zone Z1. The patron 38a can presents a ticket to the reader 28. In some embodiments, the patron's 38 identification may be performed by the patron 38 by, e.g., scanning a ticket with a barcode reader, scanning a ticket with a QR code reader, validating an electronic ticket via a credit card swipe, scanning an RFID tag with an RFID reader, analyzing biometrics (fingerprint, retina, face, etc.) scanned with a biometrics reader, and/or activating interaction between a smartphone's virtual ticket "wallet" and a Wi-Fi access point (AP)). The access network computing node 12a, via processor circuit 46, can analyze the data produced by the reader 28 to determine ticketing information associated with the patron 38a.

The access network computing node 12a, via processor circuit 46, in operation 64 may consult the venue's 54 cloud ticketing database (e.g., stored at cloud services 32) to obtain a physical location of a seat that the patron 38a will occupy. The access network computing node 12a, in operation 66, use the obtained physical location of the seat to calculate a best route to that seat. The access network computing nodes 12 can calculate, via processor circuit 46, a plurality of routes available at the venue 54 and select the best route based on any of a variety of criteria, e.g., avoidance of crowds, distance, access to food vendors, access to elevators, and/or access to restrooms, etc.

The system 10, in operation 68 performed by processor circuit 46, can use the camera 30a at the venue 54 to capture an image of the patron 38a. The analyzer 24, via processor circuit 46, may analyze the image of the patron 38a to uniquely identify the patron 38a. The analyzer 24 notes distinguishing characteristics of the patron 38, such as height, weight, clothing, hair color, facial features as determined through facial recognition, etc. The distinguishing characteristics can improve the accuracy of tracking that particular patron 38a as the particular patron 38a moves about the venue 54. If a door or turnstile is used to control admission to the venue 54, an actuator at the door or turnstile can be activated by a nearby access network computing node 12 to let the patron 38a in. If an elevator is required to reach a destination at the venue 54, a nearby access network computing node 12 can call the elevator. The elevator's availability can be timed by the nearby access network computing node 12 to open a door of the elevator when the patron 38a approaches the elevator. Operation 68, via processor circuit 46, can determine that the patron 38a is moving in the direction of the icon 40a and following the icon 40a. In some embodiments, the access network computing nodes 12 can activate door locks, environmental sensors, speakers, microphones, Wi-Fi APs, etc.

In operation 70 performed by processor circuit 46, the access network computing node 12a can detect the position of the patron 38 and locate the projector 34a in front of the patron 38a and along the selected route. The access network computing node 12a can instruct the renderer 26 associated with the projector 34a to retrieve rendering information associated with icon 40a (icon shape, color, image, animation, size, brightness, etc.) from local data storage 22 and/or memory circuit 48. The access network computing node 12a can use the retrieved rendering information to render the icon 40a on a floor and/or wall in a position the patron 38a will see it. The icon 40 can be a moving dot, a line, an arrow, the patron's initials, destination seat number, a name of the patron 38, a graphical representation of the patron's 38 likeness, a uniquely identifiable symbol, photograph, etc. In some embodiments, the icon 40 can be pre-selected by the patron 38 when buying a ticket or registering on a web site. The icon 40 can be personalized by a patron 38 in advance of an event at the venue 54 and stored in the user database 56. Alternately, the cloud services 32 or venue server 16 can assign the icon 40 to a particular patron 38. The processor circuit 46, via the controller 20 and the renderer 26, can control rendering of the icon 40a and position the icon 40a at a comfortable distance in front of the patron 38a along the selected route to the destination. If the patron 38a speeds up or slows down during a journey, the speed of icon 40a can change accordingly. Operation 80 can trigger execution of operation 68 to again determine that the patron 38a is moving in the direction of the icon 40a, and following the icon 40a.

In some embodiments, operation 70 can calculate projector 34 beam geometry. The beam geometry can be used by controller 20, in combination with the analyzer 24 and the render 26, to minimize blocking of important projected information in shadows as objects or other patrons 38 temporarily obstruct images projected by the projectors 34. For example, patron 38b is by example illustrated as following the icon 40b (e.g., a dotted arrow icon line). A shadow associated with patron 38*b* may prevent projector 34*c* from effectively creating the icon 40*b* in front of patron 38*b*. Access network computing node 12*b* can detect the shadow via camera 30*e*. The access network computing node 12*b* can instruct projector 34*d* to increase its local brightness to make a shadowed portion of the icon 40*b* appear with consistent brightness. The icon 40*b* can continue up ramps, through tunnels, up escalators, etc. at the venue 54 to guide the patron 38*b* to a section entrance of a main arena space closest to an assigned seat.

In operation 72, the access network computing node 12 via processor circuit 46 can determine that the patron 38 has moved based on continuous monitoring of the patron's 38 position with overhead cameras 30. If the access network computing node 12 determines that the patron 38 has not moved, operation 72 can trigger operation 68 to capture another image of the patron 38. If the patron 38 is determined as having moved, operation 72 can trigger operation 74. Operation 72 can include intra-node hand-offs of patron 38 monitoring and icon projection within a domain zone. The access network computing nodes 12 can implement an intra-node hand-off as a patron moves within a domain zone associated with a particular access network computing node 12. For example, the access network computing node 12*a* can hand-off monitoring of the patron 38*a* from camera 30*a* to 30*c* as the patron 38*a* moves toward domain zone Z2. Likewise, the access network computing node 12*a* can hand-off projection of the icon 40*a* from projector 34*a* to projector 34*b* as the patron 38*a* moves toward domain zone Z2. This intra-node hand-off from cameras 30 and projectors 34 continues until the patron 38 moves to another domain zone, e.g., domain zone Z2.

The access network computing node 12 via processor circuit 46, in operation 74 can determine if the patron 38 has reached their destination, e.g., a seat. In some embodiments, when the system 10 can guide the patron 38 to an assigned seat by projecting a lighted route on a floor, wall, and/or adjacent seat backs, and putting an attention-grabbing, bright, animated "this is your seat" icon 40 at the seat where the patron 38 is to sit. The system 10 can validate the ticket holder is sitting in the correct (assigned) seat using the distinguishing characteristics the system 10 noted when the ticket was read at the start of the method 60 by operation 62. If the patron 38 has reached his or her destination, operation 74 can end automated guidance for that patron 38. If the patron 38 has not reached the patron's 38 destination, operation 74 can trigger operation 76.

In operation 76, the access network computing node 12 via processor 46 can determine if the patron 38 has reached an edge of a domain zone associated with a current access network computing node 12. For example, if the access network computing node 12*a* determines that the patron 38*a* has reached an edge of the domain zone Z1, operation 76 can trigger operation 78. Otherwise, operation 76 can trigger operation 80 in which the access network computing node 12*a* via processor 46 can update icon's 40*a* location along the selected route to provide further guidance to the patron 38*a*. Operation 78 can perform an inter-node hand-off process between two access network computing nodes 12 within a contiguous sequence. In an example embodiment, access network computing node 12*a* can hand-off automated and/or augmented guidance to access network computing node 12*b* to ensure that the patron 38*a* is always viewed by at least one camera 30 and the analyzer 24 can accurately determine the patron's 38*a* position, and have renderer 26 instruct one or more projectors 34 to generating images of the icon 40*a*.

The fog computing network 18 can provide for interactive services, for example based on retrieving user preference data from user database 56. For example, as a patron 38 is guided to their assigned seat, the fog computing network 18 and/or venue server 16 can render additional graphics, and even full video images to display items that may be of special interest to each patron 38, e.g., a location of a closest restroom, nearby snack counter, or souvenir stand. These destinations can be selected based upon the computing network 18 and/or venue server 16 retrieving preferences of the patron 38 from user database 56, for example social media information, registration information, profile preferences, past history at the venue 54, group status, etc. If the patron 38 grants the system 10 access to the patron's 38 social media sites, the venue server 16 can implement data mining techniques to obtain personalized information for the patron 38. The venue server 16 can obtain the patron's 38 posted information, can analyze the posted information, and can instruct the access network computing nodes 12 to display personalized information associated with the posted information. In an example embodiment, the patron 38 may have "liked" a particular type of food on a social-media web site. The access network computing node 12 can retrieve the "liked" type of food from user database 56 and display advertising associated with the "liked" type of food available at the venue 54. In some embodiments the system 10 may calculate and render a route to food vendors at the venue 54 based on the type of food information. The access network computing nodes 12 can use the type of food information obtained from the social-media web site to personalize icon 40 projected by the projectors 34, and provide route guidance at the venue 54 based on the type of food information.

If an event's start time is drawing near, the access network computing nodes 12 can render the icon 40 to include a running countdown to encourage patrons 38 reach their seats in time. Similarly, the access network computing nodes 12 can render the icon 40 to include a distance countdown to provide the patron 38 with information on how close the patron 38 is getting to their destination (e.g., an assigned seat).

In some embodiments, the system 10 can employ gesture recognition. Gesture recognition can be employed to allow the patrons 38 to interact with the cameras 30, and thus the entire system 10. For example, the analyzer 24 can monitor hand and arm motions to determine if a patron 38 is making an identifiable gesture, e.g., a drinking gesture, an eating gesture, etc. The access network computing node 12 can send the venue server 16 the gesture information, the location of the gesture, and/or an image of the patron 38. The venue server 16 can send a text alert with a location of the gesture, the image of the patron 38, and an instruction instructing a vendor of beverages at the venue 54 to visit the patron 38 making the gesture. In some embodiments, the system 10, via venue server 16, can retrieve the patron's 38 preferred beverage from the user database 56 and instruct the vendor to send the preferred beverage to the patron 38. The system 10 can calculate a route from the vendor to the patron 38 making the gesture. The system 10 can use the cameras 30 and projectors 34 from access network computing nodes 12 to automate guidance, via an icon 40, for a vendor employee 38 to reach a location of the patron 38 making the gesture.

In another example embodiment, if a patron 38 points to a particular photo on a corridor wall at the venue 54, the access network computing nodes 12 can render a short text explanation of its significance. In another example, if a patron 38 paints a question mark in the air or stomps on a question mark icon 40c projected on the floor, the system 10 can enable the projectors 34 at the venue 54 to display help screens and/or even interactive video chats with a live agent.

Figure 4:
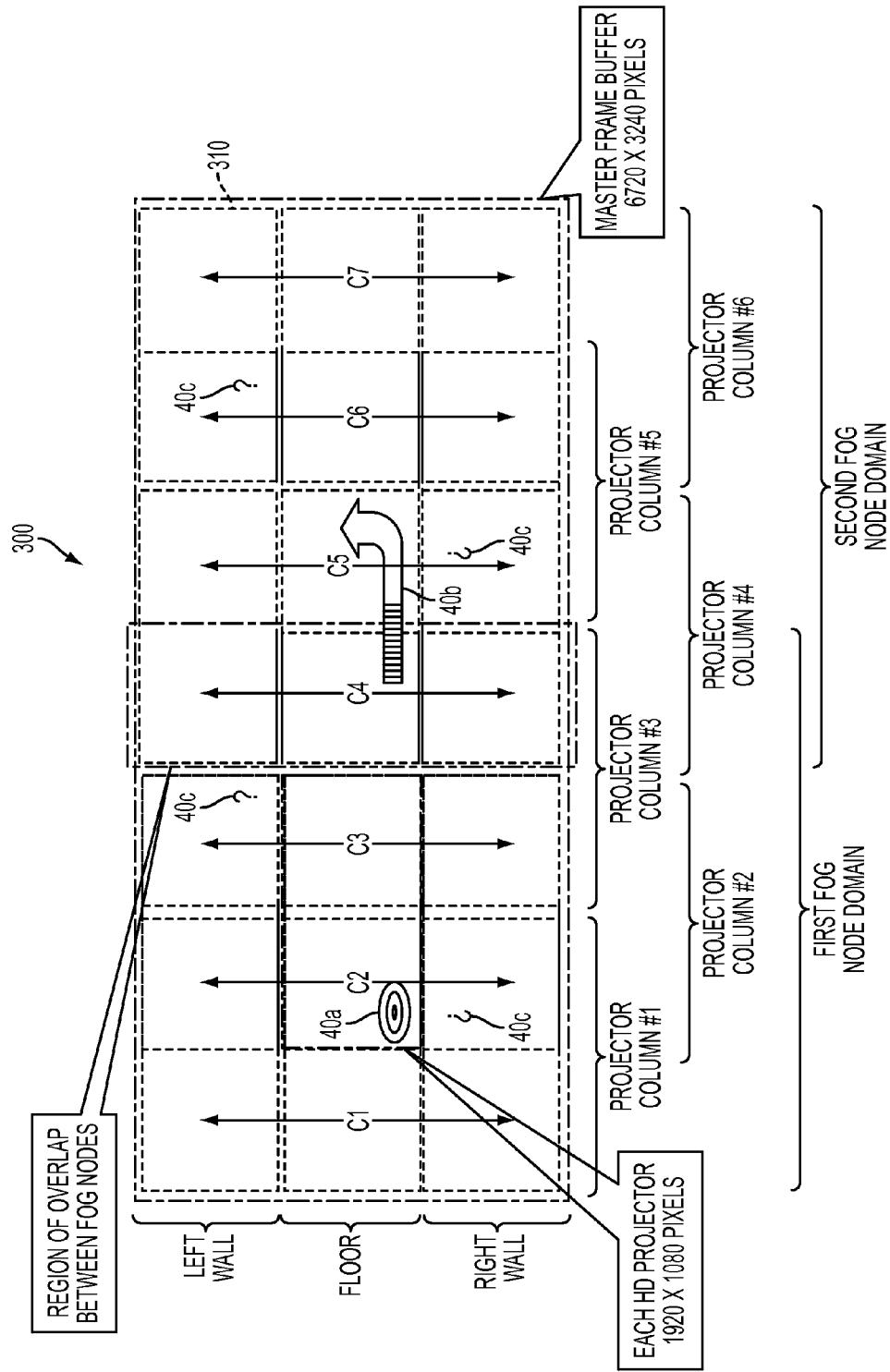
FIG. 4 is an example frame buffer that can span multiple access network computing nodes, according to an example embodiment.

FIG. 4 illustrates an example frame buffer 300 that can span multiple access network computing nodes 12, according to an example embodiment. An example frame buffer 300 that can be stored in the local data storage 22 can store an in-memory mosaic image 310. The in-memory mosaic image 310 can be made up of pixels that are to be displayed on the floors and/or walls of the venue 54. This mosaic image 310 can be distributed to multiple access network computing nodes 12 throughout the venue 54, where each access network computing node 12 is responsible for maintaining the mosaic image 310 for a set of associated projectors 34.

The example first access network computing node 12a shown can drive three sets of projectors 34a, 34b, and 34c. The three sets of projectors 34a, 34b, and 34c can be organized into a first portion of the frame buffer 300 that includes four columns, e.g., C1-C4. The three sets of projectors 34d, 34e, and 34f can be organized into a second portion of the frame buffer 300 that includes four columns, e.g., C4-C7. In example embodiments, each column of the frame buffer 300 can be a 1920×3240 pixel composite image (generated by three 1920×1080 HD micro-projectors, one for a right wall, one for a left wall, and one for a floor) that is split by the access network computing node's 12 renderer 26 to drive the access network computing node's 12 associated three projectors 34. Each of the projector columns C1-C7 can have 50% overlap with adjacent columns, an example being shown by a 960 pixel wide region of projector column C2. If the access network computing node 12a renders a graphic onto the frame buffer 300, the renderer 26 can send the frame buffer 300 to two different projectors 34. In example embodiments, the icon 40a is in the overlapping column C2 served by both projectors 34a and 34b, projector 34a may render the icon 40a on the right side of its image while the projector 34b may render the icon 40a on the left side of its projected image.

In example embodiments, the two access network computing nodes 12a and 12b can maintain six columns of projectors 34a-34f. Column C4 of frame buffer 300 can include a portion of a memory space where the two adjacent access network computing nodes 12a and 12b collaborate to fill their respective frame buffers 300 and drive their respective projectors 34a-34f. In the example embodiments, the link layer data connection 52c can be used to transfer frame buffer 300 between adjacent access network computing nodes 12.

In the example embodiments, column C4 and column C5 of frame buffer 300 can be used to render the icon 40b rendered by projector 34c and projector 34d. Column C4 can span both access network computing nodes 12a and 12b. The first access network computing node 12a can render icon 40b into its local frame buffer domain (e.g., within the local data storage 22) for display on the projector 34c in response to the first access network computing node 12a generating icon 40b. The first access network computing node 12a can also send the mosaic image 310 across the link layer data connections 52c to the second access network computing node 12b. The second access network computing node 12b can copy the mosaic image 310 into its local frame buffer 300, and render the mosaic image 310 on projector 34d, via the renderer 26. Two copies of column C4 of the frame buffer 300 can exist, one at the extreme right edge of the sub-buffer stored in the first access network computing node 12a, and another at the extreme left edge of the sub-buffer stored in the second access network computing node 12b.

A third access network computing node 12 (not shown) can have a link layer data connection 52 and can manage overlap in column C6 to the right of the second access network computing node 12b. Another access network computing node 12 (not shown) can have a link layer data connection 52 and can manage overlap in column C1 to the left of the first access network computing node 12a. In some embodiments, another access network computing node 12 (not shown) can have a link layer data connection 52 and can manage overlap and hand-off control at top and bottom edges of the frame buffer 300 to continue the chain in an orthogonal dimension for, e.g., to accommodate two right angle intersecting corridors in the venue 54. This chain can continue to create an access network 18 with as many access network computing nodes 12 as are need to provide required coverage at a venue 54.

In some embodiments, an analogous memory structure to the frame buffer 300 can exist on an input frame buffer (not shown) to manage the images acquired by the cameras 30. The image from the cameras 30 can be processed through a geometric transform, and stored in local data storage 22 in a master input frame buffer distributed across access network computing nodes 12. If a given camera 30 captures an image in the region spanning a gap between two adjacent access network computing nodes 12, the input frame buffer from the capturing camera 30 is sent, via the link layer data connection 52, from the acquiring access network computing node 12 to the adjacent access network computing node 12. The captured image spanning the gap can be made available to the analyzer 24 in multiple relevant access network computing nodes 12.

In some embodiments, the system 10 can be used to automate and/or augment patron 38 guidance in a hospital. For example, a patron 38 can enter a patient's name at a hospital welcome kiosk, the system 10 can look-up the patient's room location within the hospital, and can provide automated guidance from the hospital welcome kiosk to the patient's room. In some embodiments, the system 10 can guide the patron 38 past a nursery, and via a projector 34 can identify a newborn of interest, along with a name, weight, length, etc. The icon 40 can be used to remind the patron 38 of hospital quiet zones along a route to the patient's room.

In some embodiments, the system 10 can provide an automated guidance in an emergency mode. If the system 10 detects an emergency situation, e.g., fire, earthquake, weather hazard, and/or homeland security concern, etc., the system 10 can render icons 40 that display emergency images and provide emergency guidance on appropriate projectors 34. If communication between a first access network computing node 12 (e.g., 12a) and the venue server 16, and/or a second access network computing node 12 (e.g., 12b) becomes unavailable or unacceptably slow, the first access network computing node 12 can enter an autonomous mode to attempt to complete pre-programmed emergency operations locally without using other resources within the system 10. In the emergency mode, the system 10 can dynamically analyze traffic patterns of patrons 38, and direct the patrons 38 to an exit and/or safe area quickly. If the analyzer 24 detects that some routes are blocked, congested, and/or should be avoided due to safety concerns (e.g., fire), the system 10 can recalculate routes to redirect at least some patrons 38 away from problem areas. The system 10 can direct emergency responders to an appropriate area within a venue 54 where the emergency responders are needed with high priority.

In some embodiments, the system 10 can use the access network computing nodes 12 for retail product location, interactive trade show booths, enforcement of "keep out zones" in controlled areas like factory floors and/or prisons, etc.

In some embodiments, the system 10 can reduce staffing level requirements at the venue 54 required to manually perform usher and information desk functions, reducing the venue's 54 operational costs.

In some embodiments, a majority of pixels projected by the projectors 34 can be switched to a lower brightness "blank wall" color that supplement or largely replace indirect lighting of the venue 54.

Any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical, optical, or radio frequency transmission of the message/packet on the communications medium, and storing the detected transmission as a data structure in a non-transitory tangible memory medium in the disclosed apparatus (e.g., in a receive buffer). Also note that the memory circuit 48 can be implemented dynamically by the processor circuit 46, for example based on memory address assignment and partitioning executed by the processor circuit 46.

The operations described in any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a first access network computing node at a venue, a position of a person based on an image of the person captured with at least one camera at the venue;
   controlling rendering, by the first access network computing node, of an icon moving toward a destination at the venue in response to a determined movement of the person based on projecting an image of the icon moving for guiding the person toward the destination at the venue; and
   handing-off, by the first access network computing node, the controlling rendering of the icon to a second access network computing node in response to the position of the person moving from a first domain zone at the venue associated with the first access network computing node to a second domain zone at the venue associated with the second access network computing node.

2. The method of claim 1, further comprising:
   calculating, by the first access network computing node, a route from the person to the destination at the venue; and
   controlling rendering of the icon along the route.

3. The method of claim 2, further comprising:
   identifying the destination based on an identification of the person from a plurality of other persons at the venue; and
   the calculating includes calculating the route to the destination associated with the person.

4. The method of claim 2, further comprising:
   recalculating, by the first access network computing node, the route based on the person straying from the route.

5. The method of claim 1, further comprising:
   reading, at the first access network computing node, ticketing information associated with the person; and
   retrieving, by the first access network computing node, seating information associated with the ticket from a venue server.

6. The method of claim 1, wherein the controlling rendering includes causing the icon to uniquely identify the person from a plurality of other identified persons at the venue.

7. The method of claim 1, further comprising maintaining, by the first access network computing node, a mosaic image including the icon in a frame buffer memory of the first access network computing node.

8. The method of claim 1, wherein the first access network computing node and the second access network computing node are neighboring access network computing nodes, the controlling rendering including controlling overlapping projections of the icon between the moving from the first domain zone to the second domain zone.

9. The method of claim 1, further comprising receiving, at the first access network computing node, a hand-off of the controlling rendering of the icon from a third access network computing node.

10. The method of claim 1, wherein the determining includes uniquely identifying the person based on executing facial recognition on the image.

11. The method of claim 1, further comprising obtaining personalized information associated with the person from a server configured to store user-specific attribute information.

12. The method of claim 11, further comprising customizing, by the first access network computing node, the controlling rendering of the icon based on the personalized information and the determined movement of the person toward the destination.

13. The method of claim 1, further comprising:
determining a gesture from the captured image; and
initiating a service for the person based on the gesture.

14. An apparatus comprising:
a network interface circuit configured to interface a first access network computing node in a venue with a second access network computing node at the venue; and
a processor circuit configured to determine a position of a person based on an image of the person captured with at least one camera at the venue, control rendering of an icon moving toward a destination at the venue in response to a determined movement of the person based on controlling projection of the icon moving for guiding the person toward the destination at the venue, and hand-off the control of rendering of the icon to the second access network computing node in response to the position of the person moving from a first domain zone at the venue associated with the first access network computing node to a second domain zone at the venue associated with the second access network computing node.

15. The apparatus of claim 14, wherein the processor circuit is further configured to:
calculate a route from the person to the destination at the venue; and
control rendering of the icon along the route.

16. The apparatus of claim 15, wherein the processor circuit is further configured to:
identify the destination based on an identification of the person from a plurality of other persons at the venue; and
calculate the route to the destination associated with the identification.

17. The apparatus of claim 15, wherein processor circuit is further configured to recalculate the route based on the person straying from the route.

18. The apparatus of claim 14, wherein processor circuit is further configured to cause the icon to uniquely identify the person from a plurality of other identified persons at the venue.

19. The apparatus of claim 14, wherein the processor circuit is further configured to:
read ticket information associated with the person; and
retrieve seating information associated with the ticket from a venue server.

20. The apparatus of claim 14, wherein the processor circuit is further configured to maintain a mosaic image including the icon in a frame buffer memory of the first access network computing node.

21. The apparatus of claim 14, wherein the first access network computing node and the second access network computing node are neighboring access network computing nodes, the processor circuit configured to control overlapping projections of the icon between the moving from the first domain zone to the second domain zone.

22. The apparatus of claim 14, wherein the processor circuit is further configured to receive a hand-off of the controlling rendering of the icon from a third access network computing node.

23. The apparatus of claim 14, wherein the processor circuit is further configured to uniquely identifying the person based on executing facial recognition on the image.

24. The apparatus of claim 14, wherein the processor circuit is further configured to obtain personalized information associated with the person from a server configured to store user-specific attribute information.

25. The apparatus of claim 14, wherein the processor circuit is further configured to customize the control of rendering of the icon based on the personalized information and the determined movement of the person toward the destination.

26. The apparatus of claim 14, wherein the processor circuit is further configured to:
determine a gesture from the captured image; and
initiate a service for the person based on the gesture.

27. Logic encoded in one or more non-transitory tangible media for execution by a machine and when executed by the machine operable for:
determining, by a first access network computing node at a venue, a position of a person based on an image of the person captured with at least one camera at the venue;
controlling rendering, by the first access network computing node, of an icon moving toward a destination at the venue in response to a determined movement of the person based on projecting an image of the icon moving for guiding the person toward the destination at the venue; and
handing-off, by the first access network computing node, the controlling rendering of the icon to a second access network computing node in response to the position of the person moving from a first domain zone at the venue associated with the first access network computing node to a second domain zone at the venue associated with the second access network computing node.

* * * * *